United States Patent [19]
Gickler

[11] Patent Number: 5,837,191
[45] Date of Patent: Nov. 17, 1998

[54] LEAD-FREE SOLDER

[75] Inventor: Alan E. Gickler, Clinton, Iowa

[73] Assignee: Johnson Manufacturing Company, Princeton, Iowa

[21] Appl. No.: 734,979

[22] Filed: Oct. 22, 1996

[51] Int. Cl.$^6$ .................................................. C22C 13/00
[52] U.S. Cl. .......................... 420/560; 420/561; 420/562
[58] Field of Search .................................... 420/557, 560, 420/561, 562

[56] References Cited

U.S. PATENT DOCUMENTS

| | | | |
|---|---|---|---|
| 4,695,428 | 9/1987 | Ballentine et al. | 420/561 |
| 4,758,407 | 7/1988 | Ballentine et al. | 420/560 |
| 4,778,733 | 10/1988 | Labrano et al. | 428/647 |
| 5,352,407 | 10/1994 | Seelig et al. | 420/561 |
| 5,405,577 | 4/1995 | Seelig et al. | 420/561 |
| 5,527,628 | 6/1996 | Anderson et al. | 428/647 |

FOREIGN PATENT DOCUMENTS

| | | |
|---|---|---|
| 4-2739 | 1/1992 | Japan . |
| 8-132279 | 5/1996 | Japan . |
| 183037 | 6/1966 | U.S.S.R. . |
| 323223 | 8/1970 | U.S.S.R. . |
| WO9425634 | 11/1994 | WIPO . |

*Primary Examiner*—Sikyin Ip

[57] ABSTRACT

A lead-free solder pursuant to the invention consists essentially of, in weight %, about 0.75% to about 2% antimony, about 0.05% to about 0.6% copper, about 0.05% to about 0.6% silver, about 0.05% to about 0.6% nickel and balance essentially tin. An even more preferred solder consists essentially of, in weight %, about 0.8% to about 1.8% antimony, about 0.05% to about 0.15% copper, about 0.05% to about 0.15% silver, about 0.05% to about 0.15% nickel and balance essentially tin.

3 Claims, No Drawings

LEAD-FREE SOLDER

FIELD OF THE INVENTION

The present invention relates to a lead-free solder for use in plumbing and other soldering applications where higher strength joints to copper, brass, stainless steel and the like and excellent solder flow and wetting characteristics are advantageous.

BACKGROUND OF THE INVENTION

Lead metal (Pb) and its compounds are well known toxins. Despite this, lead has been a component of solder alloys in widespread use in the past for a wide variety of soldering applications, such as plumbing, electronic, and other soldering applications. For example, a general purpose binary 50 weight % Sn—50 weight % Pb solder (50/50 Sn/Pb) has been in widespread use, especially for plumbing uses. However, many state governments and Congressional legislation (e.g. federal Safe Drinking Water Act) have or have already proposed to restrict use of such solders for soldering copper tubing and pipe for potable drinking water systems.

As a result, manufacturers and users of Pb-bearing solders have attempted to develop alternative Pb-free solders especially as direct replacements for conventional Sn—Pb solders. For example, U.S. Pat. Nos. 4,758,407; 4,695,428; 4,778,733; 5,352,407; 5,405,577; and 5,527,628 relate to lead-free solders.

SUMMARY OF THE INVENTION

The present invention provides a solder consisting essentially of, in weight %, about 0.75% to about 2% antimony, about 0.05% to about 0.6% copper, about 0.05% to about 0.6% silver, about 0.05% to about 0.6% nickel and balance essentially tin wherein the solder provides higher strength strength joints to copper, brass, stainless steel and the like as well as excellent flow and wetting characterisitics for filling tight capillary type joints as well as loose joints between fittings and pipes.

A preferred lead-free solder composition pursuant to the present invention consists essentially of, in weight %, about 0.8% to about 1.8% antimony, about 0.05% to less than about 0.5% copper, about 0.05% to less than about 0.5% silver, about 0.05% to less than about 0.5% nickel and balance essentially tin.

An even more preferred lead free solder pursuant to the present invention consists essentially of, in weight %, about 0.8% to about 1.8% antimony, about 0.05% to about 0.15% copper, about 0.05% to about 0.15% silver, about 0.05% to about 0.15% nickel and balance essentially tin.

The solder of the invention is advantageous in that it can provide high strength joints to copper, brass, stainless steel, and other frequently soldered metallic materials and excellent flow and wetting behavior without the need for lead. Moreover, the melting range of the more preferred solder is approximately 40 degrees F. that approaches the melting range of conventional 50/50 Pb/Sn solder so as to constitute a replacement solder therefor in many genral purpose applications again without the need for lead in the solder.

DETAILED DESCRIPTION OF THE INVENTION

The present invention provides a solder that exhibits high joint strength with copper, brass, stainless steel, and other frequently soldered metallic materials for a variety of uses including, but not limited to, plumbing, electronics, and general purpose soldering applications. Further, the solder of the invention exhibits excellent flow and wetting behavior effective to fill tight capillary joints as well as loose joints betwen fittings and pipes. Moreover, the melting range of the more preferred leadfree solder of the present invention approximates the melting range of conventional 50/50 Pb/Sn solder so as to constitute a replacement solder therefor in many general applications without the need for and use of lead.

To this end, the present invention envisions a solder consisting essentially of, in weight %, about 0.75% to about 2% antimony, about 0.05% to about 0.6% copper, about 0.05% to about 0.6% silver, about 0.05% to about 0.6% nickel and balance essentially tin. Copper is included in the solder composition to provide a widened melting temperature range, while silver is included to add strength and nickel is included to further widen the melting range as well as increase solder wetting to copper and brass. In one embodiment of the present invention, the solder composition is controlled to provide a melting range (between liquidus and solidus temperatures) which approximates the melting range of 53 degrees F. of 50/50 Sn/Pb general purpose solder (although the liquidus and solidus temperatures will be higher than those of 50/50 Sn/Pb solder).

A preferred solder composition pursuant to the present invention consists essentially of, in weight %, about 0.8% to about 1.8% antimony, about 0.05% to less than about 0.5% copper, about 0.05% to less than about 0.5% silver, about 0.05% to less than about 0.5% nickel and balance essentially tin. An even more preferred solder pursuant to the present invention consists essentially of, in weight %, about 0.8% to about 1.8% antimony, about 0.05% to about 0.15% copper, about 0.05% to about 0.15% silver, about 0.05% to about 0.15% nickel and balance essentially tin. The melting range of the more preferred solder of approximately 40 degrees F. approaches the range of melting of conventional 50/50 Pb/Sn solder (e.g. 53 degrees F.) so as to constitute a replacement solder therefor in many general purpose soldering applications without the need for lead in the solder.

Certain alloying elements may be included in the solder composition to tailor properties to particular solder applications that may be encountered. For example, Pb, In, Al, Fe, Bi, and Cd optionally may be present in amounts up to about 0.50 weight % of the alloy to increase or modify the solder melting range and increase corrosion resistance, Pb and Cd being optionally present when permitted in certain applications. Moreover, Li, Ce, P, B, Se, Au, Mg, Te, and Be optionally may be included in amounts up to about 0.10 weight % of the alloy to increase substrate wetting, enhance microstructure by grain refining action, increase fatique resistance, and/or increase intermetallic phase temperature stability.

EXAMPLE

For purposes of illustration and not of limitation, an exemplary preferred lead-free solder composition of the present invention consists essentially of, in weight %, 98.4% Sn, 1.3% Sb, 0.1% Cu, 0.1% Ag, and 0.1% Ni. Such a solder pursuant to the invention exhibits a melting temperature range between the solidus and liquidus temperatures of approximately 40 degrees F., the solidus temperature being about 410 degrees F. and liquidus temperature being about 450 degees F. In soldering trials, the solder has been observed to exhibit excellent flow and wetting relative to copper and brass materials effective to fill tight capillaries as well as large gaps as would be encountered between pipe and fittings (i.e loose joints) to produce sound soldered joints and thus will be useful for plumbing and other general purpose soldering applications.

The solder of the invention is amenable to manufacture as solid round wire and is also suitable for solder wire cored with rosin or organic or inorganic fluxes. The solder also can be manufactured in the form of atomized solder powder which can be mixed with flux to provide a solder paste. The solder also can be provided as thin sheets, foil, ribbon, preforms and other useful forms including billets, bars, and ingots.

Although the present invention has been described in terms of certain embodiments thereof, it is not intended to be limited thereto but rather only to the extent set forth hereafter in the following claims.

I claim:

1. Lead-free solder consisting of, in weight %, about 0.8% to about 1.8% antimony, about 0.05% to about 0.5% copper, about 0.05% to about 0.5% silver, about 0.05% to about 0.5% Ni and balance tin.

2. Lead-free solder consisting of, in weight %, about 0.8% to about 1.8% antimony, about 0.05% to less than about 0.15% copper, about 0.05% to less than about 0.15% silver, about 0.05% to less than about 0.15% Ni and balance tin.

3. Solder consisting of, in weight %, about 0.75% to about 2% antimony, about 0.05% to about 0.6% copper, about 0.05% to about 0.6% silver, about 0.05% to about 0.6% Ni and balance tin.

* * * * *